US012792337B2

(12) United States Patent
Gallagher et al.

(10) Patent No.: US 12,792,337 B2
(45) Date of Patent: Nov. 10, 2026

(54) CONTROLLING DEPLOYMENT OF SOFTWARE APPLICATIONS BY SOFTWARE EXTENSIONS

(71) Applicant: RED HAT, INC., Raleigh, NC (US)

(72) Inventors: Brian Gallagher, Waterford (IE); Michael Browne, Dublin (IE)

(73) Assignee: Red Hat, Inc., Raleigh, NC (US)

( * ) Notice: Subject to any disclaimer, the term of this patent is extended or adjusted under 35 U.S.C. 154(b) by 299 days.

(21) Appl. No.: 18/606,037

(22) Filed: Mar. 15, 2024

(65) Prior Publication Data

US 2025/0291574 A1 Sep. 18, 2025

(51) Int. Cl.
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
CPC .................................... G06F 8/65; G06F 8/61
See application file for complete search history.

(56) References Cited

U.S. PATENT DOCUMENTS 12,355,774 B1 * 7/2025 Ji ........................... H04L 67/56
2012/0102103 A1 * 4/2012 Jacobson .............. G06F 9/5072 709/204
2015/0120821 A1 * 4/2015 Bendell ................. G06F 16/957 709/203
2016/0380803 A1 * 12/2016 Phadke ............... H04L 41/0663 709/221
2020/0195671 A1 * 6/2020 Engan ................. H04L 63/1425
2021/0303368 A1 * 9/2021 Yu ............................. G06F 9/00
2022/0141149 A1 * 5/2022 Datta ...................... H04L 47/76 709/213
2022/0303271 A1 * 9/2022 Elsherif .............. H04L 63/0435
2024/0022629 A1 * 1/2024 Wang .................. H04L 41/0894
2024/0069979 A1 * 2/2024 Sakthivel ............. G06F 9/5072
2024/0419684 A1 * 12/2024 Achi Vasudevan ..... G06F 16/27

* cited by examiner

*Primary Examiner* — Wei Y Mu
*Assistant Examiner* — Feven H Huruy
(74) *Attorney, Agent, or Firm* — Kilpatrick Townsend & Stockton LLP

(57) ABSTRACT

A system can be provided for controlling software application deployment based on resource data for an associated software extension. For example, the system can extract first resource data for a software extension from a code base of the software extension. The software extension can be used to deploy a software application. The system can further install the software extension at one or more computing clusters and can detect resource requests transmitted by the software extension during installation. The system may then generate second resource data for the software extension based on the resource requests. Additionally, the system can deploy, using the software extension, the software application at a computing cluster. The computing cluster can be selected based on the first resource data and the second resource data and the computing cluster can be separate from the one or more computing clusters.

14 Claims, 3 Drawing Sheets

CONTROLLING DEPLOYMENT OF SOFTWARE APPLICATIONS BY SOFTWARE EXTENSIONS

TECHNICAL FIELD

The present disclosure relates generally to software extensions in distributed computing environments. More specifically, but not by way of limitation, this disclosure relates to controlling deployment of software applications by software extensions.

BACKGROUND

To help automate the deployment, scaling, and management of software resources inside containers, some distributed computing environments may include container orchestration platforms. Container orchestration platforms can help manage containers to reduce the workload on users. One example of a container orchestration platform is Kubernetes. Distributed computing environments running Kubernetes can be referred to as Kubernetes environments.

Kubernetes environments can include software operators ("operators") for automating various repeatable tasks, such as deployment, scaling, and backup of software resources. In the context of Kubernetes, an operator is a software extension that can manage an assigned software resource, such as a stateful application. Once deployed, operators can create, configure, and manage instances of their assigned software resources on behalf of a user in a declarative way.

Operators can be deployed in a Kubernetes environment using an Operator Lifecycle Manager (OLM). The OLM can assist users in installing, updating, and managing the lifecycles of operators. The OLM has a user interface through which users can select operators to install and uninstall. The OLM can deploy the operators based on manifest files (e.g., YAML files) defining properties of the operators.

DETAILED DESCRIPTION

Figure 1:
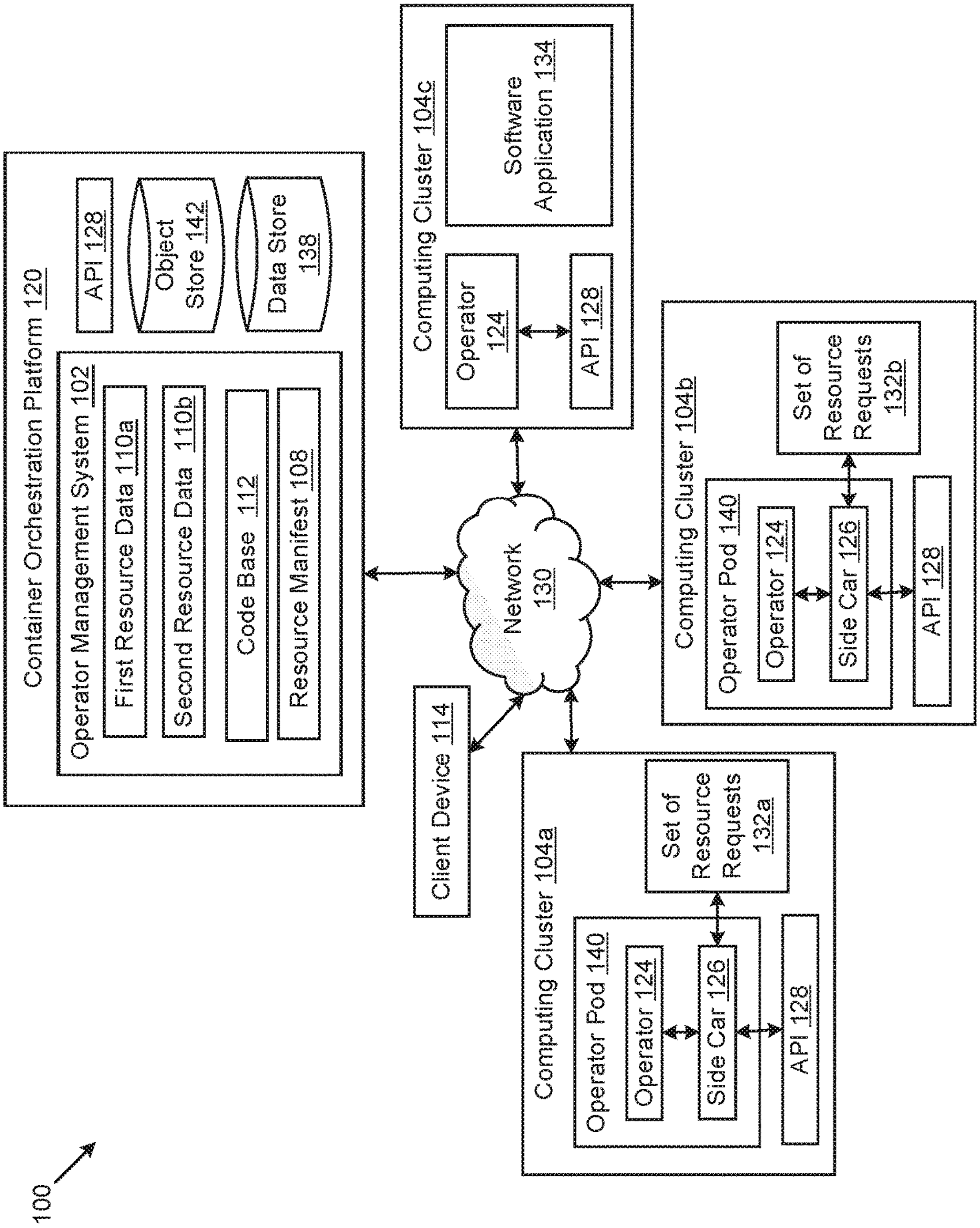
FIG. 1 is a block diagram of an example of a system for controlling deployment of software applications by software extensions according to some embodiments of the present disclosure.

Software operators ("operators") can be installed and updated in a distributed computing environment to deploy and manage software applications in the distributed computing environment. The operators can be software extensions that can automate application specific tasks such as deployment, scaling, upgrades, or the like. The operators can automate the application specific tasks using custom resources and custom controllers. The custom resources can include configuration files, which may define a desired state of a software application or of a computing cluster ("cluster") in which the software application may be deployed. The custom controllers can then automatically provision or reconfigure computing resources in the distribution computing environment to maintain the desired state of the software application or cluster.

For a particular software application, a corresponding operator can depend on various resources of a cluster. That is, for the operator to run (e.g., perform the application specific tasks), the various resources may have to exist and be available on the cluster. Additionally, fields within the various resources may have to exist. For example, an available and existent resource and corresponding fields may be defined in a custom resource and compatible with the cluster. Often times, a missing (e.g., an undefined or incompatible) resource or field may not become apparent until runtime of the operator. As a result, the operator can become unstable, which, in turn, can cause instability (e.g., degrade performance and cause latency) at the software application the operator is managing. Additionally, in some examples, one of the various resources or a field within one of the resources can be removed during runtime of the operator, which can also cause the operator to become unstable.

Some examples of the present disclosure can overcome one or more of the abovementioned problems by providing an operator management system that can control deployment of software applications by operators. In particular, the operator management system may control installation of an operator based on resource data to control a subsequent deployment of a software application by the operator. The resource data can include a set of resources on which the operator depends, one or more fields included in each resource, expected values for each field, or a combination thereof. The operator management system can then scan a cluster in which the operator is to be deployed prior to installation of the operator. In doing so, the operator management system can, for example, determine whether each resource exists and is available at the cluster. If each resource is available, the operator management system can deploy the operator at the cluster. If one or more resources are not available or do not exist, the operator management system can prevent installation of the operator at the cluster. In this way, the operator management system can confirm resources on which the operator depends will be available prior to an installation process of the operator. In other words, the operator management system can confirm a high likelihood of successful installation of the operator prior to the installation process. As a result, the operator can be unlikely to become unstable and, consequently, latency and performance degradation at the software application can be prevented. Additionally, by preventing operator deployment in a cluster with a missing, incompatible, or otherwise unavailable resource, the operator management system can prevent inefficient and unnecessary computing resource usage at the cluster.

One particular example can involve clusters that are running Kubernetes as a container orchestration platform. Kubernetes can include an operator lifecycle manager (OLM) for managing operators. A user can interact with the OLM to request installation of a particular operator in a particular cluster. Prior to the installation process, an operator management system may analyze the operator, the cluster, or a combination thereof to ensure the efficiency of the installation process. For example, the operator management system can receive a code base of the operator. The operator management system can then scan the code base to identify dependencies, namespaces, resources, or the like, which the operator may use to deploy or manage a software application at the cluster. The operator management system can further analyze runtime analysis data for the operator. The runtime analysis data can be generated by the operator management system installing the operator at one or more clusters and collecting data related to application programming interface (API) server calls or other suitable actions performed by the operator at each cluster. Therefore, based on the runtime analysis data, the operator management system can identify additional resources or resource parameters (e.g., field and values) that may be used during runtime of the operator at a cluster.

The operator management system can then combine the information from the code base and from the runtime analysis data to generate a resource manifest for the operator. The operator management system can then scan the cluster in view of the resource manifest to determine whether each resource, field, and value are valid and available in the cluster. That is, the operator management system can ensure that the resources, fields, and values are properly defined and can be configured at the cluster. Based on determining each resource, field, value is valid and available, the operator management system can cause the operator to be installed in the cluster. For example, the operator management system can transmit a command to the OLM to cause the OLM to install the operator in the cluster. The operator management system can then use the operator to deploy the software application at the cluster. For example, once installed, the operator can transmit API server calls to a Kubernetes API to deploy the software application.

Although software extensions for deploying and managing software applications according to various aspects are referred to as "operators," software extensions can refer to other software tools for deploying and managing software applications beyond operators. For example, the software extensions can be middleware, web browser extensions, automation tools (e.g., Ansible), API gateways and service meshes, or the like.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for controlling deployment of software applications by software extensions according to some embodiments of the present disclosure. The system 100 includes one or more computing clusters ("clusters") 104*a-c* that may be formed from multiple nodes (e.g., servers or other computing devices) in communication with one another over one or more networks (e.g., network 130). Examples of the one or more networks can include a local area network (LAN), wide area network (WAN), the Internet, or any combination thereof. The nodes may communicate with one another to collectively perform tasks in the clusters 104*a-c*. For example, the nodes can communicate with one another to perform distributed data processing or other distributed projects in each cluster.

The system 100 can further include a container orchestration platform 120 such as Kubernetes for assisting with managing (e.g., deploying and scaling) software resources ("resources") inside containers within the clusters 104*a-c*. To that end, the container orchestration platform 120 can, in some examples store objects, which can be data structures representing the resources. The resources can include microservices or serverless functions that collectively implement the overall functionality of a software application. The container orchestration platform 120 can further include an application programming interface (API) 128, which can be a central interface through which operational instructions for a cluster can be communicated. The container orchestration platform 120 can also include an operator management system 102 for managing operator installation and operations at clusters. The operator management system 102 may do so via communication with the API 128. In the context of Kubernetes, the operator management system 102 can be part of an operator lifecycle manager (OLM) or the operator management system 102 can be separate from and communicatively coupled to the OLM.

In some examples, a user may wish to deploy a software application 134 by adding an operator 124 to a cluster 104*c*. To do so, the user can operate a client device 114 to interact with the operator management system 102 to request installation of the operator 124 at the cluster 104*c*. Examples of the client device 114 can include a desktop computer, laptop computer, or mobile phone. The client device 114 may be internal or external to the cluster 104*c* and can communicate with the cluster 104*c* via one or more networks, such as the Internet. In some examples, resources on which the operator 124 depends to deploy and manage the software application 134 at the cluster 104*c* may not be available or may not exist. Therefore, prior to installation of the operator 124 at the cluster 104*c* and in response to the user interaction, the operator management system 102 can perform an analysis of the operator 124, the cluster 104*c*, or a combination thereof. The operator management system 102 can then control installation of the operator 124 based on the analysis to facilitate efficient installation of and computing resource usage by the operator 124.

For example, the operator management system 102 may perform a static analysis of the operator 124. The static analysis can include the operator management system 102 analyzing a code base 112 of the operator 124. The code base 112 can include a collection of source code defining functionality of the operator 124. For example, the code base 112 can include logic for managing a lifecycle of the associated software application 134. The code base 112 can be in a programming language such as GO, python, Java or the like. Components of the code base 112 can include custom resource definitions (e.g., YAML files defining resources associated with the software application 134), dependencies of the operator 124 (e.g., libraries and modules on which the operator 124 may depend), configuration files defining the operator's configuration settings, code detailing operational tasks of the operator 124 (e.g., deploying, scaling, or updating software application 134).

By analyzing the code base 112, the operator management system 102 can extract first resource data 110*a* for the operator 124. For example, in scanning the code base 112, the operator management system 102 can identify API server calls the operator may transmit to the API 128. The API server calls can be made to configure instances of resources (e.g., objects) associated with the software application 134. The operator management system 102 can also identify namespaces associated with the operator 124. The operator management system 102 can further identify fields within the resources, values associated with the fields, or a combination thereof based on the code base 112. As a result, any combination of the information relating to the API server calls, namespaces, resources, fields, and values can be included in the first resource data 110*a*.

In some examples, there may be additional actions (e.g., additional API server calls made to create or modify resources, fields within the resources, or values for the fields) performed by operator 124 at runtime that may not be detectable in the code base 112. The actions can be referred to as resource requests. In some examples, an external event (e.g., a user action or a change in a state of the cluster 104*c*) may cause the operator 124 to transmit a request resource (e.g., an API server call to create or modify a resource). Additionally, implicit Kubernetes mechanisms (e.g., controllers and watchers), third-party services (e.g., external services or APIs which with the software application 134 may interact), or other suitable external factors or dependencies may be managed by the operator 124 in a dynamic manner, thereby causing the operator 124 to generate and transmit the resource requests.

To identify the actions the operator 124 may perform at runtime at the cluster 104*c*, the operator management system 102 can further perform a runtime analysis of the operator 124. To do so, the operator management system may analyze execution of the operator 124, or of a similar operator (e.g., a previous version of the operator 124), at another cluster. For example, the operator management system 102 can deploy an operator pod 140 at a first cluster 104*a* and at a second cluster 104*b*. The operator 124 or the similar operator can be deployed within the operator pod 140. Additionally, a sidecar container 126 can be deployed within the operator pod 140.

The sidecar container 126 can record the actions (e.g., resource requests made in the form of API server calls) initiated by the operator 124. For example, the sidecar container 126 can be configured as a proxy server, which may be conceptually positioned as an intermediary between the operator 124 and the API 128. The operator 124 can be configured to transmit the resource requests, which the sidecar container 126 can intercept and analyze before passing the resource requests on to the API 128. As another example, the operator 124 can output the resource requests on a messaging bus, which can be monitored by the sidecar container 126 to detect the resource requests. By detecting and analyzing the resource requests, the sidecar container 126 can determine the actions initiated by the operator 124. Other ways of determining the actions initiated by the operator 124 are also possible.

Therefore, by deploying the operator pod 140 with the sidecar container 126, a first set of resource requests 132*a* performed by the operator 124 at the first cluster 104*a* and a second set of resource requests 132*b* performed by the operator at the second cluster 104*b* can be identified. Second resource data 110*b* can then be derived from the first set of resource requests 132*a* and the second set of resource requests 132*b*. As a result, any combination of the information relating to the resource requests (e.g., API server calls made, resources, fields, and values created or modified, etc.) can be included in the second resource data 110*b*. Although two clusters 104*a-b* are shown, the operator pod 140 may be deployed at any number of clusters. Additionally or alternatively, the operator management system 102 can retrieve runtime analysis data stored in a data store 138 of the container orchestration platform 120 for use in generating the second resource data 110*b*. Additionally, the first and second resource data 110*a-b* can be stored in the data store 138 for use in a future analysis of the operator 124.

After generating the first resource data 110*a* and the second resource data 110*b*, the operator management system 102 can generate a resource manifest 108 for the operator 124. The resource manifest 108 can include a set of resources, that the operator 124 may request during installation at the cluster 104*c*. The resource manifest 108 may further include parameters for each resource. For example, the resource manifest 108 can include one or more fields corresponding to each of the resources. In some examples, one or more expected values corresponding to each of the field can also be included in the resource manifest 108. The resources, fields, and values included in the resource manifest 108 can be derived from the first resource data 110*a* and the second resource data 110*b*.

In some examples, actions detected during the runtime analysis of the operator 124 at the first cluster 104*a* or the second cluster 104*b* may not occur at the third cluster 104*c*. For example, at the first cluster 104*a*, the operator 124 may modify a resource in response to a cluster state change. The sidecar container 126 can intercept and identify a resource request corresponding to the modification. But, due to the resource request being specific to the cluster state change, corresponding resource fields or values may not be used at the third cluster 104*c*. To determine which resource requests are most likely to be relevant to the third cluster 104*c*, and therefore which resource data to include in the resource manifest 108, further analysis of the resource requests can be performed.

For example, the operator management system 102 may predict which resource requests of the first set of resource requests 132*a* and the second set of resource requests 132*b* are relevant to the third cluster 104*c*. To do so, the operator management system 102 can determine a percentage of clusters 104*a-b* at which the operator 124 transmitted each resource request of the first and second sets of resource requests 132*a-b*. Additionally or alternatively, the operator management system 102 can determine a percentage of clusters 104*a-b* at which the operator 124 transmitted a resource request associated with a particular resource. If the percentage exceeds a threshold (e.g., 50%, 75%, or 90%), data corresponding to the resource request (e.g., a corresponding resource, resource parameters, or a combination thereof) can be included in the second resource data 110*b*, the resource manifest 108, or a combination thereof. If the percentage is less than the threshold, the data corresponding to the resource request may be excluded from the second resource data 110*b*, the resource manifest 108, or the combination thereof, or may be included with an indication of being optional.

After generating the resource manifest 108, the operator management system 102 can control installation of the operator in the cluster 104*c* based on the resource manifest 108. For example, the operator management system 102 can scan the cluster 104*c* to determine whether each resource in the set of resources included in the resource manifest 108 exists and is available on the cluster 104*c*. If each resource of the set of resources exists and is available on the cluster 104*c*, the operator management system 102 can install the operator 124 at the cluster 104*c*. This may involve the operator management system 102 transmitting one or more commands to the API 128 of the container orchestration platform 120 to cause the operator 124 to be deployed in the cluster 104*c*.

Once the operator 124 is running in the cluster 104*c*, the operator 124 may perform one or more actions to deploy the software application 134 at the cluster 104*c*. Examples of such actions can include adding an object (e.g., an instance of a resource from the set of resources) to the object store 142, deleting an existing object from the object store 142, or modifying the content of an existing object in the object store 142. To perform said actions, in some examples the operator 124 can transmit corresponding commands to the API 128 of the container orchestration platform 120.

Additionally, in some examples, once the operator 124 is installed on the cluster 104*c*, the operator management system 102 can monitor the cluster 104*c* for changes to objects corresponding to the set of resources, fields, or values in the resource manifest 108. During this time, the operator management system 102 can receive a resource termination request. The resource termination request can be a request to remove an instance of a resource (e.g., an object) during runtime of the operator 124. Additionally or alternatively, the operator management system 102 can receive a resource modification request, which can be a request to delete or modify a field or value within the object. In response to receiving a resource termination request or resource modification request, the operator management system 102 can determine whether the request involves a resource, field, or value in the resource manifest 108. If the request involves a resource, field, or value from the resource manifest 108, the operator management system 102 can deny the request to prevent removal of or modification to objects during the runtime of the operator 124. In this way, the operator management system 102 can prevent disruption to operator 124 operations or operator instability.

In some examples, upon receiving a resource modification or termination request, the operator management system 102 can transmit an alert to a client device from which the request was received. The alert can warn a user of the client device that the object is depended upon by the operator 124. The user may then choose to continue the termination or modification request or abandon the request. In this way, the operator management system 102 can prevent accidental deletion or modification to objects on which the operator 124 depends.

In contrast to the above, if one or more resources in the resource manifest 108 do not exist or are not available on the cluster 104*c*, the operator management system 102 can prevent installation of the operator 124. That is, the operator management system 102 may not transmit the one or more commands to the API 128. Additionally, the operator management system 102 can transmit an alert to the client device 114 to notify the user that initiated the operator deployment that the one or more resources are not available or do not exist. In some examples, the operator management system 102 can further select an alternative cluster at which the resources are available, install the operator 124 on the alternative cluster, and use the operator 124 to deploy the software application 134 at the alternative cluster.

Additionally, in some examples, if a resource indicated as optional is not available, the operator management system 102 transmit an alert to the client device indicating that the optional resource is not available. In such examples, the operator management system 102 may automatically install the operator 124 at the cluster 104*c*. Alternatively, in such examples, the operator management system 102 may prevent installation of the operator until another request to install the operator on the cluster 104*c* is received.

Figure 2:
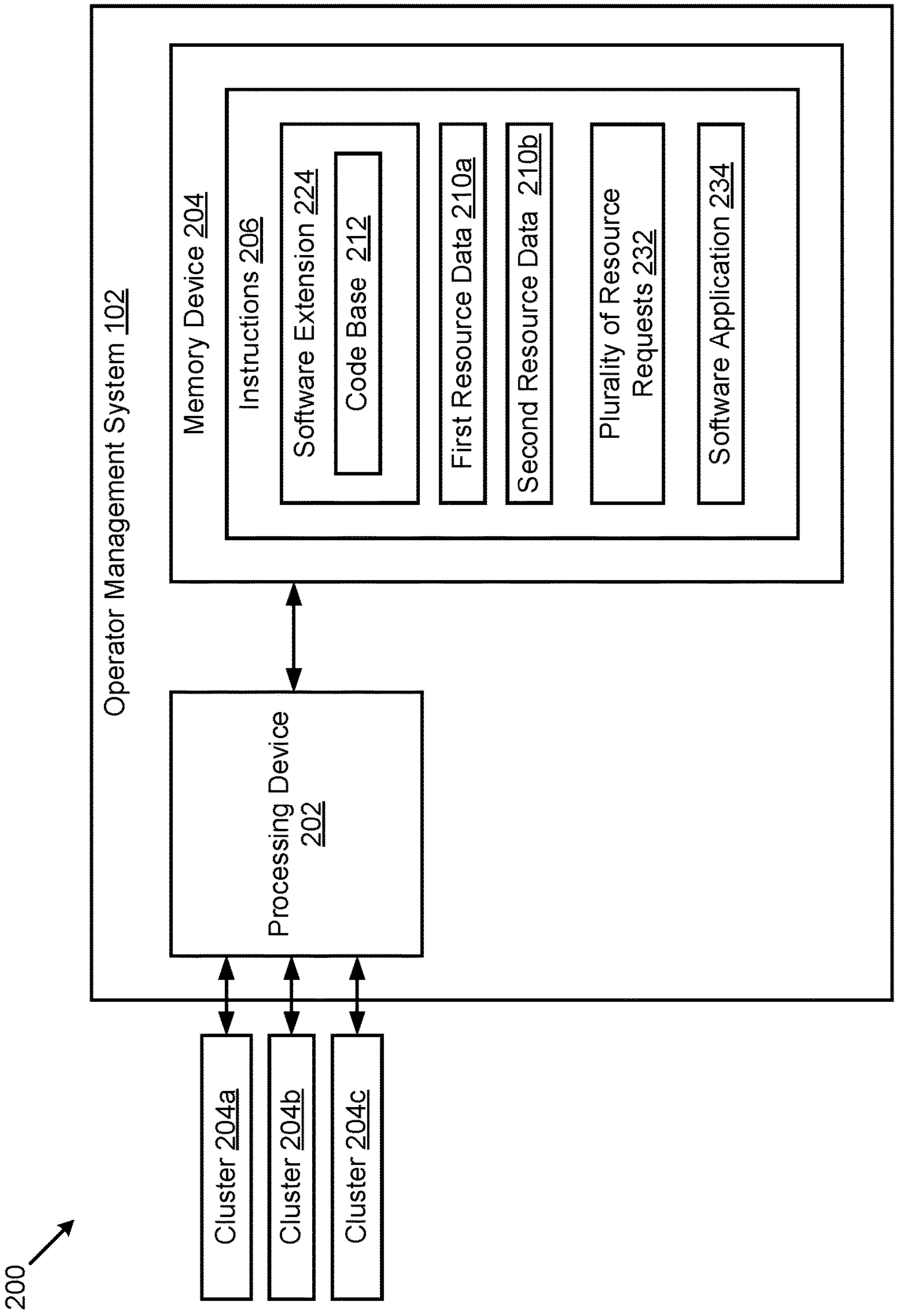
FIG. 2 is a block diagram of an example of an operator management system for controlling deployment of software applications by software extensions according to some embodiments of the present disclosure.

FIG. 2 is a block diagram of an example of a system 200 for controlling deployment of software applications by software extensions according to some embodiments of the present disclosure. The system 200 includes a processing device 202 communicatively coupled with a memory device 204. The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, etc.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a computer-readable medium from which the processing device 202 can read instructions 206. A computer-readable medium can include electronic, optical, magnetic, or other storage devices capable of providing the processing device 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processing device 202 can execute the instructions 206 to perform operations. For example, the processing device 202 can extract first resource data 210*a* for a software extension 224 from a code base 212 of the software extension 224. The software extension 224 can be used to deploy a software application 234. The processing device 202 can further install the software extension 224 at a plurality of computing clusters 204*a-b*. The processing device 202 can detect, during installation of the software extension 224 at the plurality of computing clusters 204*a-b*, a plurality of resource requests 232 transmitted by the software extension 224. The processing device 202 can then generate, based on the plurality of resource requests 232, second resource data 210*b* for the software extension 224. Additionally, the processing device 202 can deploy, using the software extension 224, the software application 234 at a computing cluster 204*c*. The computing cluster 204*c* can be selected based on the first resource data 210*a* and the second resource data 210*b*, and the computing cluster 204*c* can be separate from the plurality of clusters 204*a-b*.

Figure 3:
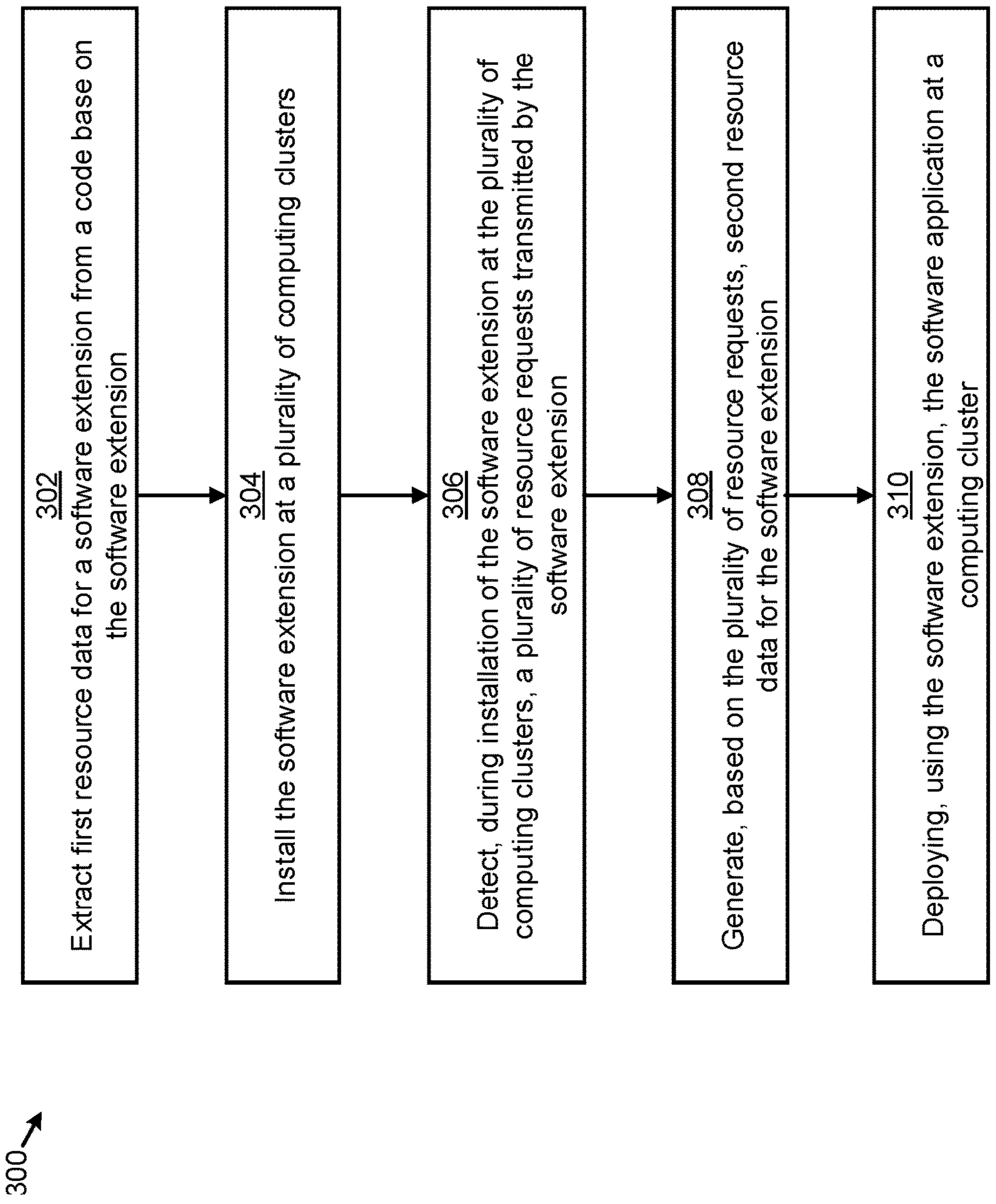
FIG. 3 is a flowchart of a process for controlling deployment of software applications by software extensions according to some embodiments of the present disclosure.

FIG. 3 is a flowchart of a process 300 for controlling deployment of software applications by software extensions according to some embodiments of the present disclosure. In some examples, the processing device 202 can implement some or all of the steps shown in FIG. 3. For example, the processing device 202 can execute the operator management system 102 of FIG. 1 to perform one or more of the steps shown in FIG. 3, Other examples can include more steps, fewer steps, different steps, or a different combination of steps than are shown in FIG. 3. The steps of FIG. 3 are discussed below with reference to the components discussed above in relation to FIG. 1-2.

At block 302, the processing device 202 can extract first resource data 210*a* for a software extension 224 from a code base 212 of the software extension 224. In an example, the software extension 224 can correspond to the operator 124 depicted in FIG. 1. Thus, to extract the first resource data 210*a* the processing device 202 can analyze a code base 112 of the operator 124. The code base 112 can include YAML files defining resources associated with a software application 234, dependencies of the operator 124, configuration files defining configuration settings for the operator 124, and other suitable information. The processing device 202 can identify, based on the code base 112, API server calls the operator 124 may transmit to an application programming interface (API) 128 associated with a container orchestration platform 120 during installation at a cluster 204*c*. The processing device 202 can also identify namespaces, resources, or a combination thereof which the operator 124 may use to run at the cluster 204*c*, to deploy or manage the software application 234, or a combination thereof. The processing device 202 may further identify fields associated with the resources, values associated with the fields, or a combination thereof based on the code base 112. The first resource data 210*a* extracted by the processing device 202 can therefore include the information relating to the API server calls, namespaces, resources, fields, and values indicated by the code base 112.

At block 304, the processing device 202 can install the software extension 224 at a plurality of computing clusters 204*a-b*. In the example, the processing device 202 can deploy the operator 124 at a first cluster 204*a* and at a second cluster 204*b*. The processing device 202 may deploy the operator 124 in an operator pod 140.

At block 306, the processing device 202 can detect, during installation of the software extension 224 at the plurality of computing clusters 204*a-b*, a plurality of resource requests 232 transmitted by the software extension 224. In the example, the processing device 202 can deploy, with the operator pod 140, a sidecar container 126 at the first cluster 204*a* and the second cluster 204*b*. The sidecar container 126 can be configured as a proxy server, which may be conceptually positioned between the operator 124 and the API 128. The operator 124 can be configured to transmit commands to the API 128, which the sidecar container 126 may intercept and analyze before passing the commands on to an API 128. In doing so, the sidecar container 126 can detect the resource requests 232 initiated by the operator 124 at each of the computing clusters 204*a-b*. The resource requests 232 can be requests to create a resource or to modify an existing resource (e.g., by modifying a field or value) at the clusters 204*a-b*.

At block 308, the processing device 202 can generate, based on the plurality of resource requests 232, second resource data 210*b* for the software extension 224. In the example, the processing device 202 can receive the resource requests 232 from the sidecar container 126, and can generate the second resource data 110*b* based on the resource requests 232. Thus, the second resource data 110*b* can include information relating to the resource requests (e.g., resources, fields, and values the operator requested the API modify or create during installation at the clusters 204*a-b*).

In some examples, the processing device 202 can further generate, based on the first resource data 210*a* and the second resource data 210*b*, a resource manifest 108 for the operator 124. The resource manifest 108 can include a set of resources usable by the operator 124 to deploy a software application 234. That is, the resource manifest 108 can include the set of resources indicated in the first resource data 210*a* from the code base 112 and the second resource data 210*b* from execution of the operator 124. Because the operator 124 may be configured for deploying and managing the software application 234, the set of resources derived from the first and second resource data 210*a-b* can be the resources which enable the operator to deploy and manage the software application 234. The resource manifest 108 may further include parameters for each resource. For example, the resource manifest 108 can include one or more fields corresponding to each resource and one or more expected values corresponding to each of the field.

At block 310, the processing device 202 can deploy, using the software extension 224, the software application 234 at a computing cluster 204*c*. The computing cluster 204*c* can be selected based on the first resource data 210*a* and the second resource data 210*b* and the computing cluster 204*c* can be separate from the plurality of clusters 204*a-b*. In the example, the processing device 202 can scan the cluster 204*c* to determine whether each resource from the first resource data 210*a* and the second resource data 210*b* exists and is available on the cluster 204*c*. Based on each resource of the set of resources being available on the cluster 204*c*, the processing device 202 can select the cluster 204*c* and install the operator 124 at the cluster 204*c*. For example, the processing device 202 can transmit one or more commands to the API 128 of the container orchestration platform 120 to cause the operator 124 to be deployed in the cluster 204*c*. Once the operator 124 is installed, the processing device 202 can use the operator 124 to deploy the software application 234. For example, the operator 124 can transmit requests, on behalf of the processing device 202, to the API 128 to configure the cluster 204*c* and deploy the software application 234.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

What is claimed is:

1. A system comprising:
- a processing device; and
- a memory device including instructions that are executable by the processing device for causing the processing device to perform operations comprising:
  - extracting first resource data for a software extension from a code base of the software extension, the software extension being usable to deploy a software application;
  - installing the software extension at a plurality of computing clusters;
  - detecting, during installation of the software extension at the plurality of computing clusters, a plurality of resource requests transmitted by the software extension;
  - generating, based on the plurality of resource requests, second resource data for the software extension;
  - generating, based on the first resource data and the second resource data, a resource manifest comprising a set of resources usable to deploy the software application at a computing cluster by:
    - identifying, based on the second resource data, a plurality of resources;
    - determining a percentage of the plurality of computing clusters at which the software extension requested each resource of the plurality of resources during installation;
    - determining, for each resource of the plurality of resources, whether the percentage exceeds a threshold; and
    - for each percentage exceeding the threshold, including a corresponding resource of the plurality of resources in the resource manifest; and
    - deploying, using the resource manifest, the software application at the computing cluster, the computing cluster being selected based on the first resource data and the second resource data, and the computing cluster being separate from the plurality of computing clusters.

2. The system of claim 1, wherein the operation of detecting, during installation of the software extension at the plurality of computing clusters, the plurality of resource requests transmitted by the software extension comprises:

deploying, at each computing cluster of the plurality of computing clusters, a sidecar container; and recording, by the sidecar container, the plurality of resource requests transmitted by the software extension to an application programming interface during installation at each computing cluster of the plurality of computing clusters.

3. The system of claim 1, wherein the operations further comprise, prior to deploying the software application at the computing cluster:

determining whether each resource in the set of resources is available on the computing cluster; and based on determining that each resource in the set of resources is available on the computing cluster, installing the software extension in the computing cluster.

4. The system of claim 1, wherein the operations further comprise, subsequent to deploying the software application at the computing cluster:

receiving a resource termination request, the resource termination request being a request to remove a resource during runtime of the software extension;

in response to receiving the resource termination request, determining whether the resource is associated with the software extension based on the first resource data and the second resource data; and based on the resource being associated with the software extension, deny the resource termination request to prevent removal of the resource during the runtime of the software extension.

5. The system of claim 1, wherein the first resource data comprises a first set of resources and, for each resource in the first set of resources, at least one field, and wherein the second resource data comprises a second set of resources.

6. A method comprising:

extracting first resource data for a software extension from a code base of the software extension, the software extension being usable to deploy a software application;

installing the software extension at a plurality of computing clusters;

detecting, during installation of the software extension at the plurality of computing clusters, a plurality of resource requests transmitted by the software extension;

generating, based on the plurality of resource requests, second resource data for the software extension;

generating, based on the first resource data and the second resource data, a resource manifest comprising a set of resources usable to deploy the software application at a computing cluster by:

identifying, based on the second resource data, a plurality of resources;

determining a percentage of the plurality of computing clusters at which the software extension requested each resource of the plurality of resources during installation;

determining, for each resource of the plurality of resources, whether the percentage exceeds a threshold; and for each percentage exceeding the threshold, including a corresponding resource of the plurality of resources in the resource manifest; and deploying, using the resource manifest, the software application at the computing cluster, the computing cluster being selected based on the first resource data and the second resource data, and the computing cluster being separate from the plurality of computing clusters.

7. The method of claim 6, wherein detecting, during installation of the software extension at the plurality of computing clusters, the plurality of resource requests transmitted by the software extension comprises:

deploying, at each computing cluster of the plurality of computing clusters, a sidecar container; and recording, by the sidecar container, the plurality of resource requests transmitted by the software extension to an application programming interface during installation at each computing cluster of the plurality of computing clusters.

8. The method of claim 6, further comprising, prior to deploying the software application at the computing cluster:

determining whether each resource in the set of resources is available on the computing cluster; and based on determining that each resource in the set of resources is available on the computing cluster, installing the software extension in the computing cluster.

9. The method of claim 6, further comprising, subsequent to deploying the software application at the computing cluster:

receiving a resource termination request, the resource termination request being a request to remove a resource during runtime of the software extension;

in response to receiving the resource termination request, determining whether the resource is associated with the software extension based on the first resource data and the second resource data; and based on the resource being associated with the software extension, deny the resource termination request to prevent removal of the resource during the runtime of the software extension.

10. The method of claim 6, wherein the first resource data comprises a first set of resources and, for each resource in the first set of resources, at least one field, and wherein the second resource data comprises a second set of resources.

11. A non-transitory computer-readable medium comprising program code that is executable by a processing device for causing the processing device to perform operations comprising:

extracting first resource data for a software extension from a code base of the software extension, the software extension being usable to deploy a software application;

installing the software extension at a plurality of computing clusters;

detecting, during installation of the software extension at the plurality of computing clusters, a plurality of resource requests transmitted by the software extension;

generating, based on the plurality of resource requests, second resource data for the software extension;

generating, based on the first resource data and the second resource data, a resource manifest comprising a set of resources usable to deploy the software application at a computing cluster by:

identifying, based on the second resource data, a plurality of resources;

determining a percentage of the plurality of computing clusters at which the software extension requested each resource of the plurality of resources during installation;

determining, for each resource of the plurality of resources, whether the percentage exceeds a threshold; and for each percentage exceeding the threshold, including a corresponding resource of the plurality of resources in the resource manifest; and deploying, using the resource manifest, the software application at the computing cluster, the computing cluster being selected based on the first resource data and the second resource data, and the computing cluster being separate from the plurality of computing clusters.

12. The non-transitory computer-readable medium of claim 11, wherein the operation of detecting, during installation of the software extension at the plurality of computing clusters, the plurality of resource requests transmitted by the software extension comprises:

deploying, at each computing cluster of the plurality of computing clusters, a sidecar container; and recording, by the sidecar container, the plurality of resource requests transmitted by the software extension to an application programming interface during installation at each computing cluster of the plurality of computing clusters.

13. The non-transitory computer-readable medium of claim 11, wherein the operations further comprise, prior to deploying the software application at the computing cluster:

determining whether each resource in the set of resources is available on the computing cluster; and based on determining that each resource in the set of resources is available on the computing cluster, installing the software extension in the computing cluster.

14. The non-transitory computer-readable medium of claim 11, wherein the operations further comprise, subsequent to deploying the software application at the computing cluster:

receiving a resource termination request, the resource termination request being a request to remove a resource during runtime of the software extension;

in response to receiving the resource termination request, determining whether the resource is associated with the software extension based on the first resource data and the second resource data; and based on the resource being associated with the software extension, deny the resource termination request to prevent removal of the resource during the runtime of the software extension.

* * * * *